United States Patent
Freimuth et al.

(10) Patent No.: US 7,114,096 B2
(45) Date of Patent: Sep. 26, 2006

(54) STATE RECOVERY AND FAILOVER OF INTELLIGENT NETWORK ADAPTERS

(75) Inventors: Douglas Morgan Freimuth, New York, NY (US); Ronald Mraz, South Salem, NY (US); Erich Nahum, New York, NY (US); Prashant Pradhan, New Rochelle, NY (US); Sambit Sahu, Mahopac, NY (US); John Michael Tracey, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 10/406,095

(22) Filed: Apr. 2, 2003

(65) Prior Publication Data

US 2004/0199808 A1    Oct. 7, 2004

(51) Int. Cl.
G06F 11/00    (2006.01)
(52) U.S. Cl. .............................. 714/13; 714/4; 714/15; 370/220
(58) Field of Classification Search .................. 714/13, 714/15, 4; 370/217, 220
See application file for complete search history.

(56) References Cited

U.S. PATENT DOCUMENTS

| | | | |
|---|---|---|---|
| 5,295,258 A | 3/1994 | Jewett et al. ............... 395/575 |
| 5,774,640 A | 6/1998 | Kurio .................... 395/182.02 |
| 5,941,958 A * | 8/1999 | Hwangbo .................. 709/250 |
| 6,034,962 A * | 3/2000 | Ohno et al. ................. 370/399 |
| 6,052,733 A | 4/2000 | Mahalingam et al. ....... 709/235 |
| 6,105,151 A | 8/2000 | Mahalingam et al. ......... 714/48 |
| 6,134,678 A | 10/2000 | Mahalingam et al. ......... 714/48 |
| 6,253,334 B1 | 6/2001 | Amdahl et al. ................ 714/4 |
| 6,311,288 B1 | 10/2001 | Heeren et al. ................. 714/4 |
| 6,314,525 B1 | 11/2001 | Mahalingham et al. ........ 714/4 |
| 6,721,806 B1 | 4/2004 | Boyd et al. |
| 6,763,479 B1 * | 7/2004 | Hebert ......................... 714/4 |
| 2003/0046330 A1 * | 3/2003 | Hayes ........................ 709/201 |
| 2003/0084371 A1 * | 5/2003 | Mongazon-Cazavet et al. ........................... 714/13 |
| 2003/0218982 A1 * | 11/2003 | Folkes et al. ............... 370/238 |
| 2004/0042395 A1 * | 3/2004 | Lu et al. ...................... 370/225 |
| 2004/0062267 A1 * | 4/2004 | Minami et al. ............. 370/463 |
| 2004/0078619 A1 * | 4/2004 | Vasavada ....................... 714/4 |

* cited by examiner

Primary Examiner—Robert Beausoliel
Assistant Examiner—Marc Duncan
(74) Attorney, Agent, or Firm—Duke W. Yee; Mark Wardas; Lisa L. B. Yociss (57) ABSTRACT

The present invention provides a method, computer program product, and data processing system for efficiently recovering state and performing failover of a network offload engine. The present invention distinguishes between the hard state and the soft state of a protocol. Hard state is state information that, when lost, leads to incorrect protocol behavior. Soft state is state information that may be lost or become inconsistent without loss of correctness. The present invention ensures correctness by always being able to recover the hard state of the protocol. A preferred embodiment of the present invention performs a failover of a network offload engine by temporarily blocking the reception of network packets, recovering hard state from host information, resuming network operation using a substitute network offload engine, and recovering soft state from the subsequent network activity.

43 Claims, 7 Drawing Sheets

STATE RECOVERY AND FAILOVER OF INTELLIGENT NETWORK ADAPTERS

CROSS REFERENCE TO RELATED APPLICATIONS

The present application is related to commonly-assigned, copending U.S. patent application Ser. No. 10/235,691, entitled "REMOTE DIRECT MEMORY ACCESS ENABLED NETWORK INTERFACE CONTROLLER SWITCHOVER AND SWITCHBACK SUPPORT," filed Sep. 5, 2002, which is hereby incorporated by reference.

BACKGROUND OF THE INVENTION

1. Technical Field

The present invention is related generally to intelligent network adapters. Specifically, the present invention is directed toward the state recovery and failover of a network offload engine.

2. Description of Related Art

In an Internet Protocol (IP) Network, the software provides a message passing mechanism that can be used to communicate with Input/Output devices, general purpose computers (host), and special purpose computers. IP networks generally employ what is known as a "protocol stack" to encapsulate and transmit data using a series of protocols. A typical protocol stack following the Open System Interconnection (OSI) architectural model includes a link layer protocol, a network layer protocol, a transport protocol, an upper level protocol, and an application programming interface. The key standard transport protocols used on IP networks today are the Transmission Control Protocol (TCP) and the User Datagram Protocol (UDP). TCP provides a reliable service and UDP provides an unreliable service. In the future the Stream Control Transmission Protocol (SCTP) will also be used to provide a reliable service. Processes executing on devices or computers access the IP network through Upper Level Protocols, such as Sockets, iSCSI, and Direct Access File System (DAFS).

Unfortunately the TCP/IP software consumes a considerable amount of processor and memory resources. This problem has been covered extensively in the literature (see J. Kay, J. Pasquale, "Profiling and reducing processing overheads in TCP/IP", IEEE/ACM Transactions on Networking, Vol 4, No. 6, pp. 817–828, December 1996; and D. D. Clark, V. Jacobson, J. Romkey, H. Salwen, "An analysis of TCP processing overhead", IEEE Communications Magazine, volume: 27, Issue: 6, June 1989, pp 23–29). In the future the network stack will continue to consume excessive resources for several reasons, including: increased use of networking by applications; use of network security protocols; and the underlying fabric bandwidths are increasing at a higher rate than microprocessor and memory bandwidths. To address this problem the industry is offloading the network stack processing to a dedicated network offload engine.

Today, software in the host CPU generally performs most of the transport (e.g., TCP) and network layer (e.g., IP) processing. Today, the network interface card (NIC) typically performs the link layer (e.g., Ethernet) processing and possibly a modest amount of transport or network layer offload (e.g., checksum offload). Today, the host software maintains all the state information associated with TCP/IP connections in host local memory. Keeping all the state information in host local memory allows the host software to support switchover, and switchback, between a primary NIC and an alternate NIC. That is, if the primary NIC fails, the host software moves all the connections to the alternate NIC and continues communication processing.

Network offload engines offer a higher performance interface for communicating to other general purpose computers and I/O devices. Network offload engines offload the transport (e.g., TCP) and network (e.g., IP) layer into the network offload engine. By migrating these layers into the network offload engine, the host software is no longer able to support switchover and switchback using today's mechanisms. Commonly assigned and copending U.S. patent application Ser. No. 10/235,691, entitled "REMOTE DIRECT MEMORY ACCESS ENABLED NETWORK INTERFACE CONTROLLER SWITCHOVER AND SWITCHBACK SUPPORT," which is incorporated herein by reference, provides a mechanism for supporting switchover and switchback on a network offload engine (specifically, an RNIC, an RDMA (Remote Direct Memory Access) Network Interface Card). This approach relies on the synchronization of state information between the active and standby network offload engines. This synchronization, however, can become a performance bottleneck at high speeds, because in order to ensure correctness, some protocol events must be checkpointed (that is, reconciled or synchronized between the active and standby network offload engines) as soon as they occur. In addition, the mechanism described in U.S. patent application Ser. No. 10/235,691 is specific to network interfaces supporting RDMA. Thus, what is needed is a failover mechanism of general application that minimizes the performance degradation associated with synchronizing the host with the adapter.

SUMMARY OF THE INVENTION

The present invention provides a method, computer program product, and data processing system for efficiently recovering state and performing failover of a network offload engine. The present invention distinguishes between the hard state and the soft state of a protocol. Hard state is state information that, when lost, leads to incorrect protocol behavior. Soft state is state information that may be lost or become inconsistent without loss of correctness. The present invention ensures correctness by always being able to recover the hard state of the protocol.

A preferred embodiment of the present invention maintains allows the hard state of a reliable connection protocol, such as TCP, to be recovered by enforcing two invariants (i.e., conditions that always hold true) with regard to the normal course of communication between the host and adapter. The net effect of these invariants is to allow the hard state to be recovered with less frequent checkpointing or synchronization of the host with the adapter, since hard state can be recovered from information normally maintained by the host.

A preferred embodiment of the present invention performs a failover of a network offload engine by temporarily blocking the reception of network packets, recovering hard state from host information, resuming network operation using a substitute network offload engine, and recovering soft state from the subsequent network activity.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
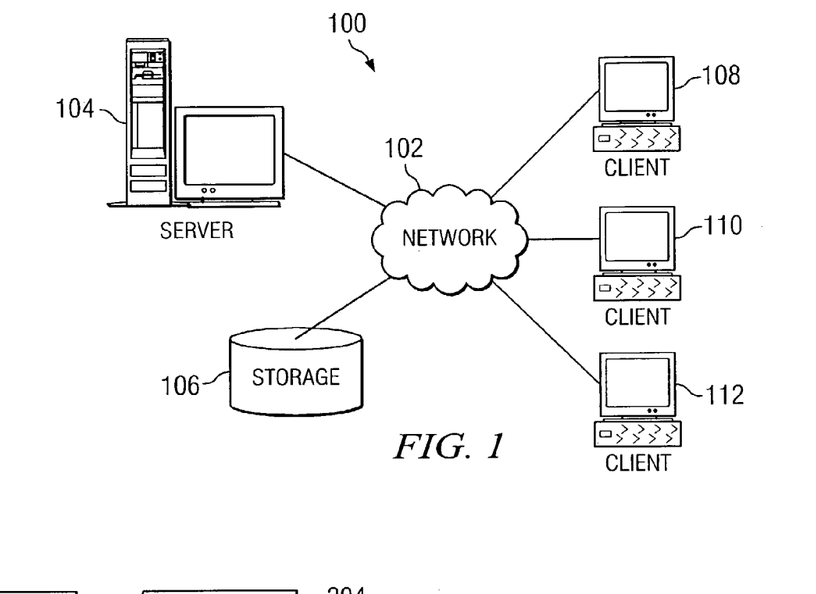
FIG. 1 is a diagram of a networked data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
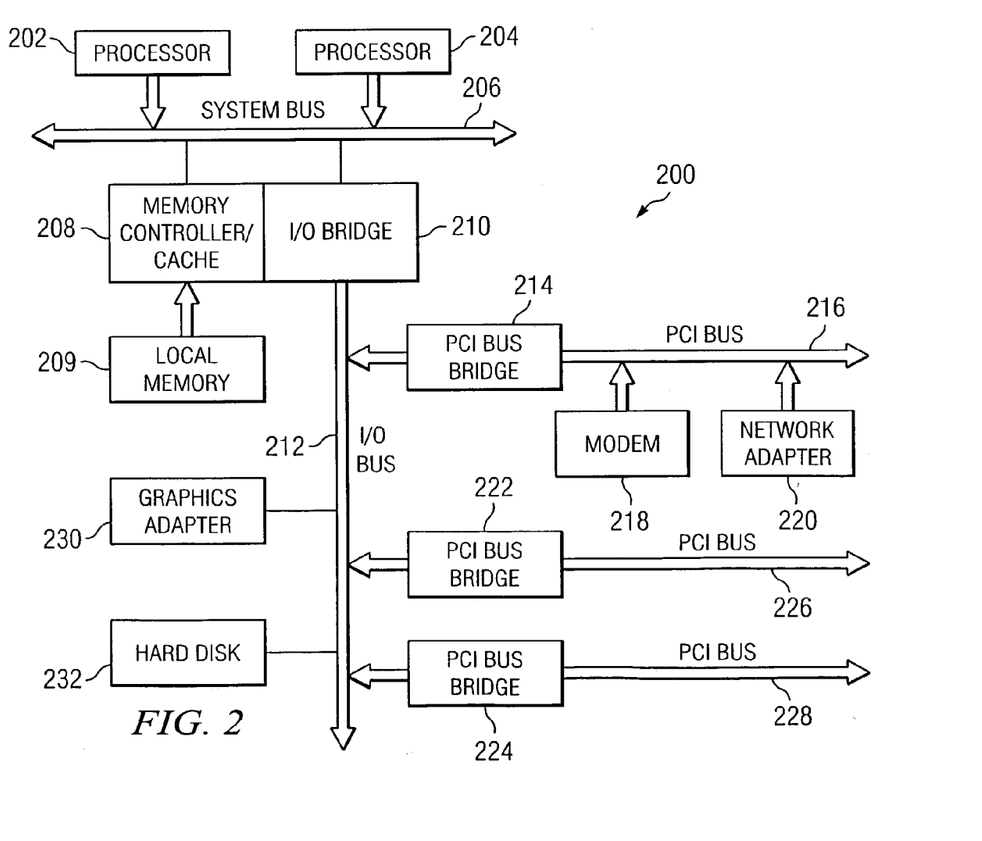
FIG. 2 is a block diagram of a server system within the networked data processing system of FIG. 1.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards. In a preferred embodiment of the present invention, network adapter 220 is a network offload engine, such as an RNIC (Remote direct memory access Network Interface Card).

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
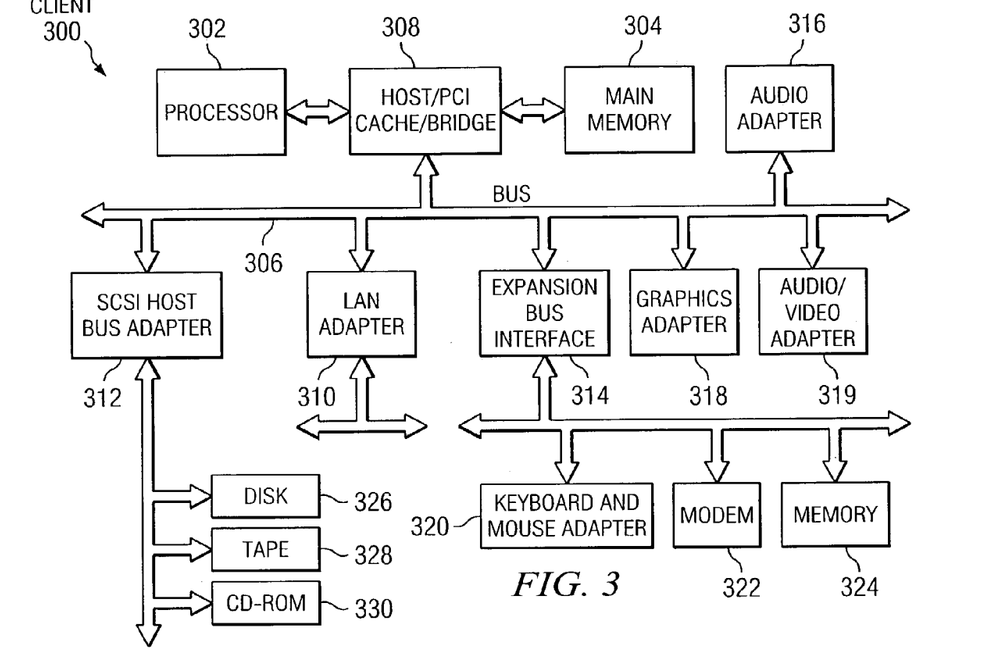
FIG. 3 is a block diagram of a client system within the networked data processing system of FIG. 1.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In a preferred embodiment of the present invention, LAN adapter 310 is a network offload engine, such as an RNIC (Remote direct memory access Network Interface Card). In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
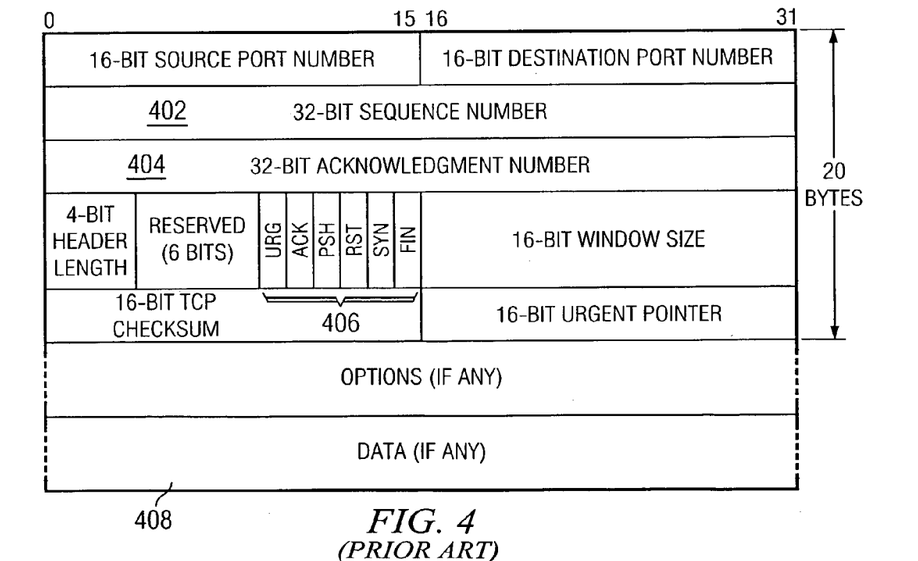
FIG. 4 is a diagram of a TCP packet.

The present invention provides a method, computer program product, and data processing system for efficiently recovering state and performing failover of a network offload engine. The preferred embodiment described herein applies the teachings of the present invention to the commonly-used Transmission Control Protocol (TCP), a reliable transport-layer connection protocol in wide use on the Internet. TCP uses sequentially-numbered packets to simulate a continuous data stream. FIG. 4 is a diagram depicting the format of a TCP packet 400. FIG. 4 is adapted from W. Richard Stevens, TCP/IP Illustrated, Vol. 1, Addison-Wesley, 1994, p. 225, FIG. 17.2. TCP packet 400 includes a 32-bit sequence number 402, a 32-bit acknowledgement number 404, and a number of flags 406. Each packet in a TCP connection is sequentially numbered with 32-bit sequence number 402. Because packets may be garbled lost in transmission or received out of order, sequence number 402 allows the receiving computer to reassemble the correct data in the correct order. When a packet is correctly received by the receiving computer, the receiving computer sends back a packet with acknowledgement number 404 containing the sequence number of the received packet and with the "ACK" flag from flags 406 set to denote an acknowledgement. This is called "sending an ACK." If the sending computer does not receive an "ACK" (e.g., because the packet was lost or garbled), the sending computer will resend the packet until it receives an ACK. If the packets are received out of order (e.g., a packet with sequence number 5 precedes a packet with sequence number 4), the receiving computer simply waits until a continuous series of packets can be assembled before making the received data available to applications.

It should thus be clear that TCP and other similar reliable connection protocols are state-aware. That is, TCP relies on the keeping of state information, such as the last sequence number received or the last sequence number sent. In general, if the state information is lost, TCP can no longer function. Thus, if a network offload engine/adapter providing a state-aware protocol, such as TCP, fails in the middle of a network connection, if the state information contained in the adapter is completely lost, the connection is permanently lost.

State information may be preserved by way of "checkpointing." The state information contained in the adapter may periodically be relayed to the adapter's host computer. In high speed operation, however, this relaying process may result in a performance bottleneck, since some protocol events require immediate checkpointing in order to preserve correctness (i.e., in order for state information to be correctly recovered in the event of a failure).

The present invention is directed toward reducing this performance bottleneck. The present invention addresses this problem in three important ways. First, the present invention distinguishes between "hard" and "soft" state information (q.v.), recognizing that for failover, only "hard" state information need be maintained. Second, the present invention provides a method of deriving hard state information from the circumstances surrounding the data transfer operations that are observable to the host. Third, the present invention, because it allows checkpointing to take place on a discretionary basis, allows a designer to tune an adapter/host design to meet desired performance requirements by varying the frequency at which checkpointing occurs.

Figure 5:
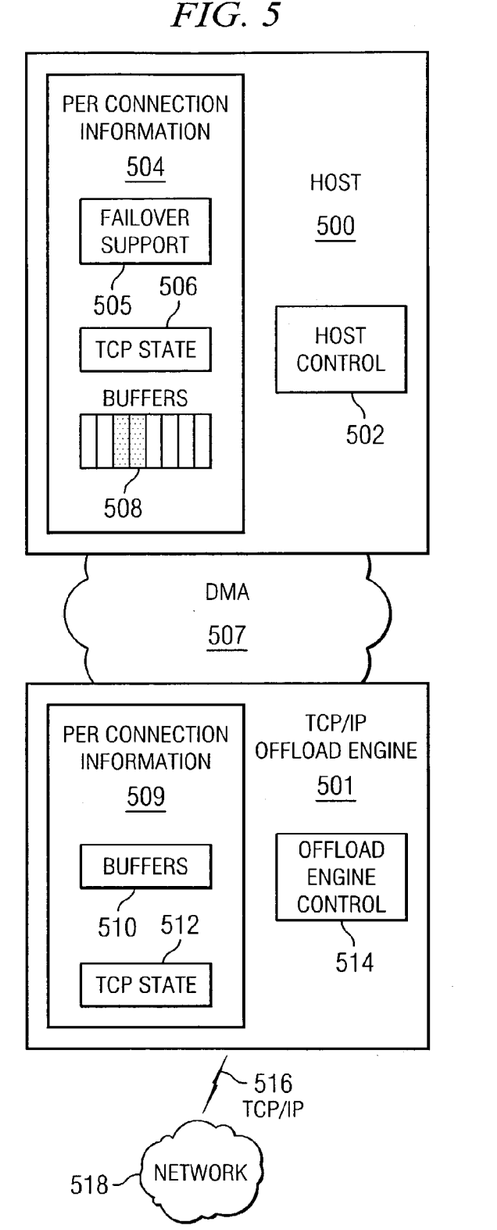
FIG. 5 is a diagram providing an overall conceptual view of a preferred embodiment of the present invention.

Before delving into the detailed operation of a preferred embodiment, however, it is helpful to consider the hardware/software context of a preferred embodiment of the present invention. FIG. 5 is a diagram providing an overall conceptual view of a preferred embodiment of the present invention. Host 500 is associated with a TCP/IP offload engine (intelligent network adapter) 501. Offload engine 501 communicates with host 500 primarily via direct memory access (DMA) 507, to allow offload engine 501 to send and receive data to/from host memory with consuming minimal processor time at host 500.

Host control software 502 provides an interface from applications to offload engine 501. Host control software 502 can also initiate a failover operation in the event offload engine 501 fails. For each TCP/IP connection the host is involved with, per-connection information 504 is stored in host 500. Per-connection information 504 includes state information 506 regarding the connection, which may include information regarding TCP sequence and acknowledgement numbers, connection parameters, and the like. In a preferred embodiment, per-connection information 504 also includes a designation 505 of whether a given connection will be given failover support in the event offload engine 501 fails. This allows a choice to be made as to which connections will be preserved when and if a failover to another offload engine occurs. In a preferred embodiment in which the well-known "sockets" application programming interface is used for network input/output (in a process executing in a Unix-based operating system, for example), designation 505 may be set through the use of a socket option. In a typical implementation of the sockets interface, a "setsockopt" function is defined to allow a socket option associated with a given connection to be set to a particular value. Buffers 508 are also includes with per-connection information 504.

Data is transferred between host 500 and offload engine 501 via DMA 507. To transfer data from host 500 over the network connection, host 500 allocates a buffer and copies the data to be transmitted into the allocated buffer. Offload engine 501 then copies the contents of the allocated buffer into one of offload engine 501's own buffers 510 in offload engine 501's own per-connection information 509. When network data is received at offload engine 501, the data is placed in one of offload engine 501's buffers 510 and copied, via DMA 507, to one of buffers 508. Thus buffers 508 and 510 may include both transmit and receive buffers.

Offload engine 501, as mentioned above, has its own per-connection information 509, including buffers 510 and TCP state information 512. Offload engine control software 514 directs the transfer of data from to/from host 500 via DMA 507 and the transfer of data via TCP/IP protocol 516 over network 518.

At this point it should be pointed out that in general, the terms "offload engine," "adapter," and "card" are herein used interchangeably unless specifically noted. An important exception to the general rule is in the case of a standby network adapter. While a preferred embodiment of the present invention uses a network offload engine as the standby adapter, one of ordinary skill in the art will recognize that a conventional "dumb" network adapter may be substituted for a network offload engine, while allowing the host to perform any protocol processing (e.g., TCP/IP processing).

Consider now the problem of providing failover of a network offload engine/adapter in the context of TCP. To address this issue, we distinguish what constitutes "hard state" and "soft state" in the context of the TCP stack. Here, hard state is defined as that state which may not be lost without losing correctness, whereas soft state is state information that is non-essential for maintaining correctness inasmuch as losing it only translates to a performance penalty. Hard state typically consists of items that are required for reliable data transfer such as sequence numbers and data buffers, and those required for connection management, such as IP addresses and negotiated options. Soft state, on the other hand, is usually information that is learned over the lifetime of the connection, such as the round-trip time, the congestion window, etc. The implication is that, when an adapter fails, as long as no hard state is lost, recovering from that failure will be possible. Performance may be affected, in that soft state will need to be regenerated, but correctness will be maintained.

Both transmit and receive buffers are hard state. Receive buffers are hard state since once they have been acknowledged to the other end, the other end cannot be expected to maintain a copy, and thus will not be able to retransmit it. Transmit buffers are hard state because once an application gives data to a reliable protocol, the host is not expected to maintain a copy; the application expects all retransmissions to occur underneath transparently. Hence for failover, such buffers must be retained in host memory. (Note that it is also possible to retain these buffers in the memory of another adapter, instead of host memory.)

Some hard state values, such as the network address of the remote host or negotiated options, are as a matter of course stored by the host, so recovery of these values is necessary.

Sequence and ACK numbers are hard state in the TCP stack, but do need to be recovered. The four key state variables in this case are "last sequence number sent", "last sequence number received", "last ACK number sent" and "last ACK number received". Keeping these numbers synchronized between the host and the adapter every time they are updated could be prohibitively expensive and might defeat the performance gains of offload. However, we demonstrate below that lockstep synchronization is not needed. The two basic ideas behind the design are as follows:

1. Since data buffers are kept in host memory, the "sequence number received" can be updated as a side-effect of data transfer from the card to the host.
2. For the other variables, we do not require strict synchronization as long as the following two invariant conditions are enforced:

2A: On the send side, the host does not free sent buffers until the ACK from the remote end for that buffer has been returned by the adapter.

2B: On the receive side, the adapter does not generate an ACK for received data until the data has been successfully transferred via DMA into the host memory. Successful DMA means that data has been transferred to the host and the appropriate notification has been written in the descriptor table.

Condition 2A ensures that, if the adapter fails, the host will always have those buffers to retransmit for which it has not seen ACKs yet. Condition 2B ensures that if the card failed without transferring some received data to the host, the remote end will always be able to retransmit that data, since the remote end is not "ACKed" until the host sees the data.

If we enforce conditions 2A and 2B, the adapter can synchronize the remaining variables with the host "lazily" at some chosen interval. This allows the adapter to batch several updates into one update, and avoid the performance overhead of frequent synchronization. How frequently the adapter returns new ACK values to the host now only becomes a performance issue and not a correctness issue. Note that there is a performance-space tradeoff in choosing the synchronization period: the longer this interval is, the fewer I/O transfers occur between the card and the host, but the host must hold on to buffers longer. A shorter interval, on the other hand, means the host can free buffers as soon as possible, but greater I/O overhead will be incurred. For performance reasons, the first case is clearly preferable, and thus the hope is that the host has enough memory to allow the card to "lazily" report acknowledgments.

Figure 6A:
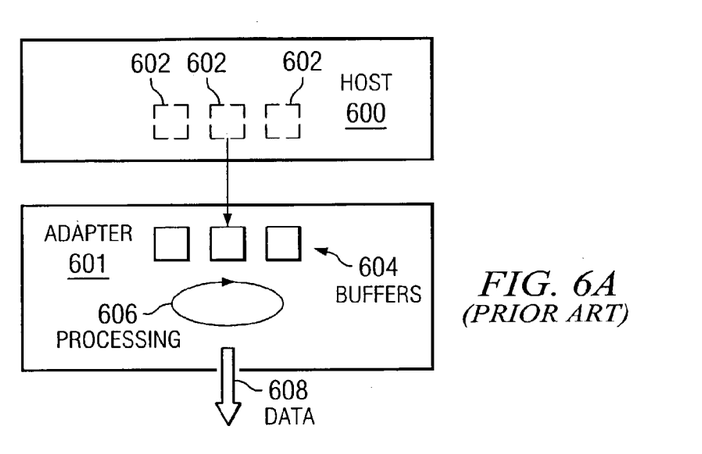
FIG. 6A is a diagram depicting a conventional approach to TCP transmission.

FIGS. 6A–6B and 7A–7B contrast normal TCP operation on an established connection as known in the art with the application of conditions 2A and 2B to an established TCP connection as may be achieved in practice in accordance with a preferred embodiment of the present invention. An established TCP connection is said to be in the "ESTABLISHED" state (see ESTABLISHED state 800 in the TCP state diagram provided in FIG. 8). FIG. 6A is a diagram depicting a conventional approach to TCP transmission. Adapter 601 (the network offload engine) copies data to be sent from buffer 602 on host 600 into adapter 601's own buffer 604. At this point host 600 will deallocate 602, as it is no longer needed. Adapter 601 processes (TCP processing 616) the data that is now in buffer 604 to place it in TCP packet form for transmission 608. Transmission 608 is repeated until an ACK corresponding to the sent data is received by adapter 601.

Figure 6B:
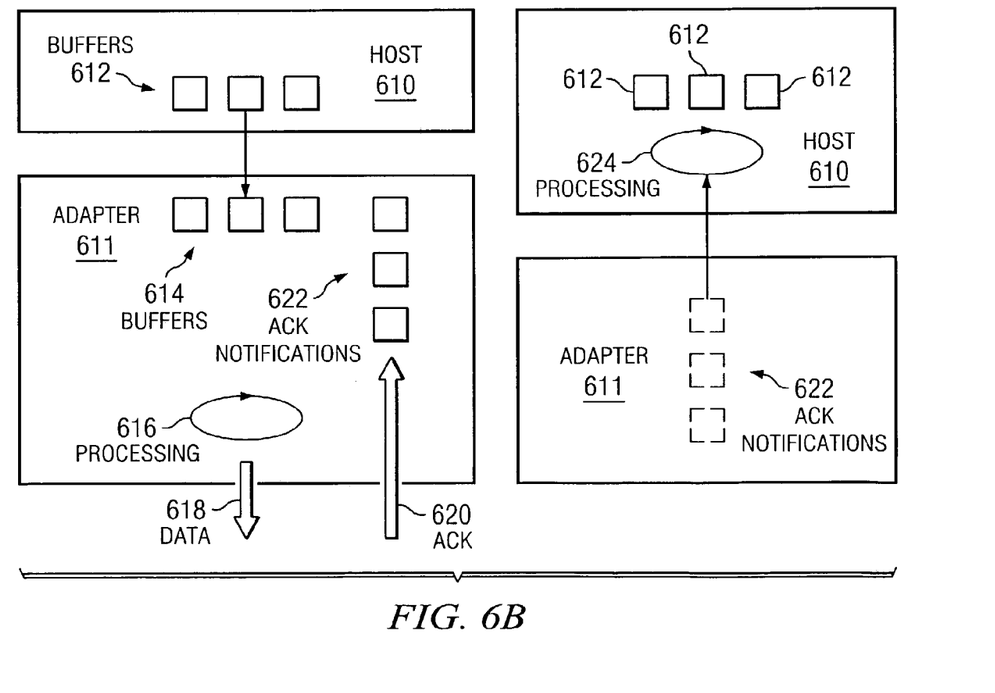
FIG. 6B is a diagram depicting TCP transmission in accordance with a preferred embodiment of the present invention.

FIG. 6B is a diagram depicting TCP transmission in accordance with a preferred embodiment of the present invention. Adapter 611 copies data from buffer 612 on host 610 into adapter 611's buffer 614, but buffer 612 is not deallocated. TCP processing 616 is performed and the data is transmitted over the network (transmission 618). When an ACK is received (ACK reception 620), an ACK notification message 622 is generated in adapter 611. At some later time, adapter 611 transmits ACK notification 622 to host 610, where host 610 processes (ACK notification processing 624) ACK notification 622 and deallocates buffer 612 in response. In a preferred embodiment of the present invention, the ACK notifications may be stored in adapter 611 temporarily and then processed in a batch fashion for greater efficiency.

Figure 7A:
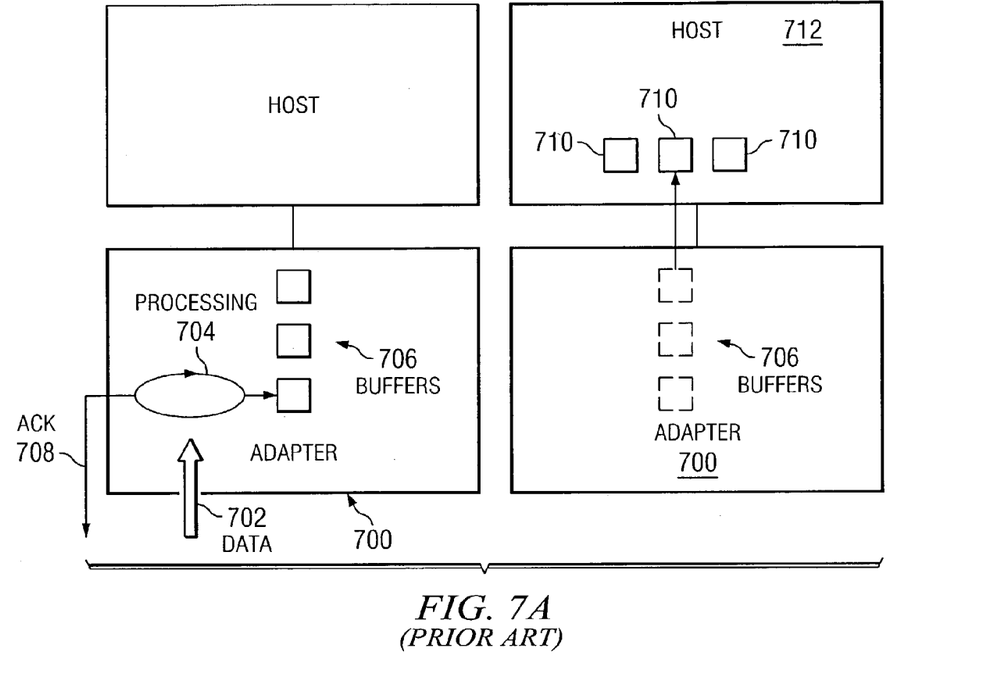
FIG. 7A is a diagram depicting a conventional approach to TCP reception.

FIG. 7A is a diagram depicting a conventional approach to TCP reception. Adapter 700 receives a TCP data packet (data reception 702) from the network. The packet is processed (TCP packet processing 704) to obtain the data stored in the packet, which is copied into buffer 706 on adapter 700. TCP packet processing 704 also results in the generation of a corresponding ACK to the packet. This ACK packet is transmitted back to the sender of the original received packet (ACK transmission 708). At a later time, buffer 706 is then copied (e.g., via DMA) into a buffer 710 on host 712 and buffer 706 is deallocated. This copying of buffers from adapter 700 to host 712 may take place in a batch process.

Figure 7B:
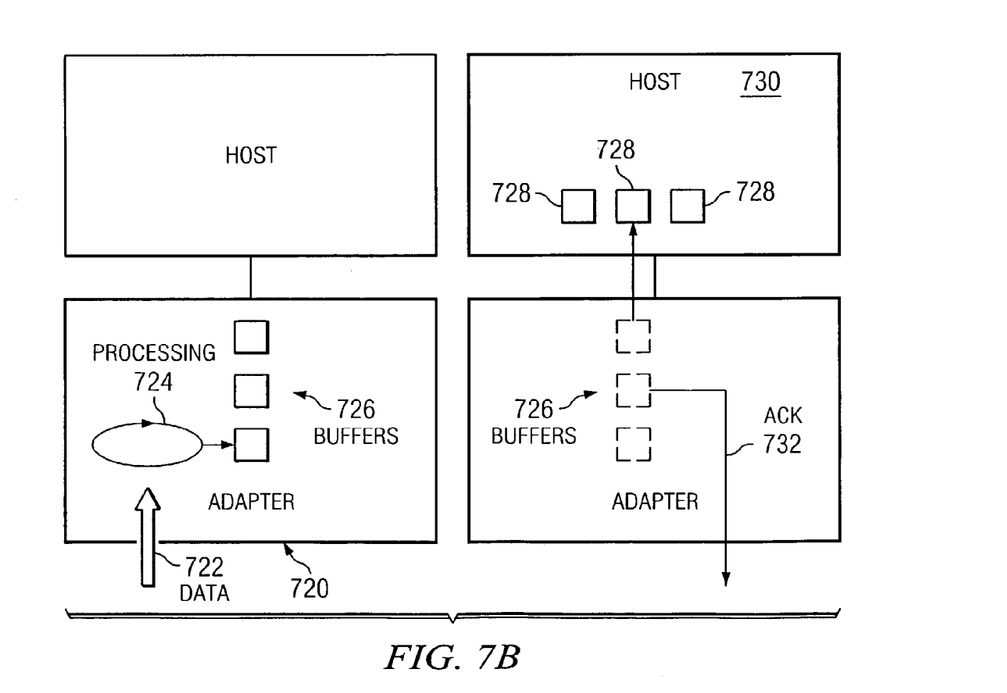
FIG. 7B is a diagram depicting TCP reception in accordance with a preferred embodiment of the present invention.

FIG. 7B is a diagram depicting TCP reception in accordance with a preferred embodiment of the present invention. Adapter 720 receives a TCP data packet from the network (data reception 722). The packet is processed (TCP packet processing 724) to obtain the data stored in the packet, which is copied into buffer 726 on adapter 720, but no ACK is generated yet. At a later time, buffer 726 is then copied (e.g., via DMA) into a buffer 728 on host 730 and buffer 726 is deallocated. Again, this copying of buffers from adapter 720 to host 730 may take place in a batch process. Once the data has been transferred from buffer 726 to buffer 728, a corresponding ACK is then generated and transmitted to original sender of the packet (ACK transmission 732).

To demonstrate that this design allows us to reconstruct the hard state of the TCP stack when the adapter fails during an established connection, we now go through each of the sequence related state variables that could be out of sync, and show how the state of the TCP connection can be recovered correctly in accordance with a preferred embodiment of the present invention.

1. "Last ACK received" (ack_received): Suppose as a result of the last synchronization between host and adapter, the host's value of ack_received is 10. After that time, the adapter receives more ACKs from the remote host and its value for ack_received is now 15 (note that ack_received on the adapter will always be equal to or greater than the value on the host.). Suppose the adapter now fails. The host does not know how many further ACKs the adapter has seen. But by condition 2A, the host has not yet freed buffers 11 through 15. This means that the host can always retransmit these buffers to reconstruct the right ack_received. If the remote end had indeed seen data up to 15, it will ACK up to 15 and the host will advance its value of ack_received to 15. If, for example, the remote end had only seen up to 14, then it will ACK up to 14, the local host will set the value for ack_received to 14, and proceed to transmit starting from 15.

2. "Last SEQ sent" (seq_sent): Suppose the last time a synchronization was performed, the host had a seq_sent value of 10. Since that time, the adapter performs more transmissions and advanced its seq_sent value to 15 (again note that seq_sent on the adapter will always be equal to or greater than the corresponding value on the host). Suppose the adapter now fails. Again, the host does not know how much buffered data has been sent out. But it is always correct to start seq_sent from the larger of ack_received and the host's old value of seq_sent. Hence, we set seq_sent=MAX(ack_received, seq_sent) and resume operation. It is important to note that by condition 2A, the host never frees a buffer until an ACK is received for it, thus the host will always have data buffered starting from ack_received. While this might lead to unnecessary transmissions of duplicate data to the remote host, this does destroy correctness.

3. "Last SEQ received" (seq_received): By condition 1, we know that seq_received will always be in sync between the adapter and the host, since every time the host receives a buffer, it updates its seq_received variable locally.

4. "Last ACK sent" (ack_sent): By condition 2B, the adapter may not generate an ACK before the buffer is copied into the host. When data is received, it will be transferred to the host, so the host will update its ack_sent. After transferring the data, the adapter may send an ACK, updating its ack_sent (note the adapter may delay sending ACKs due to the delayed ACK timer). Hence, the ack_sent will always be in sync between the adapter and the host.

Figure 8:
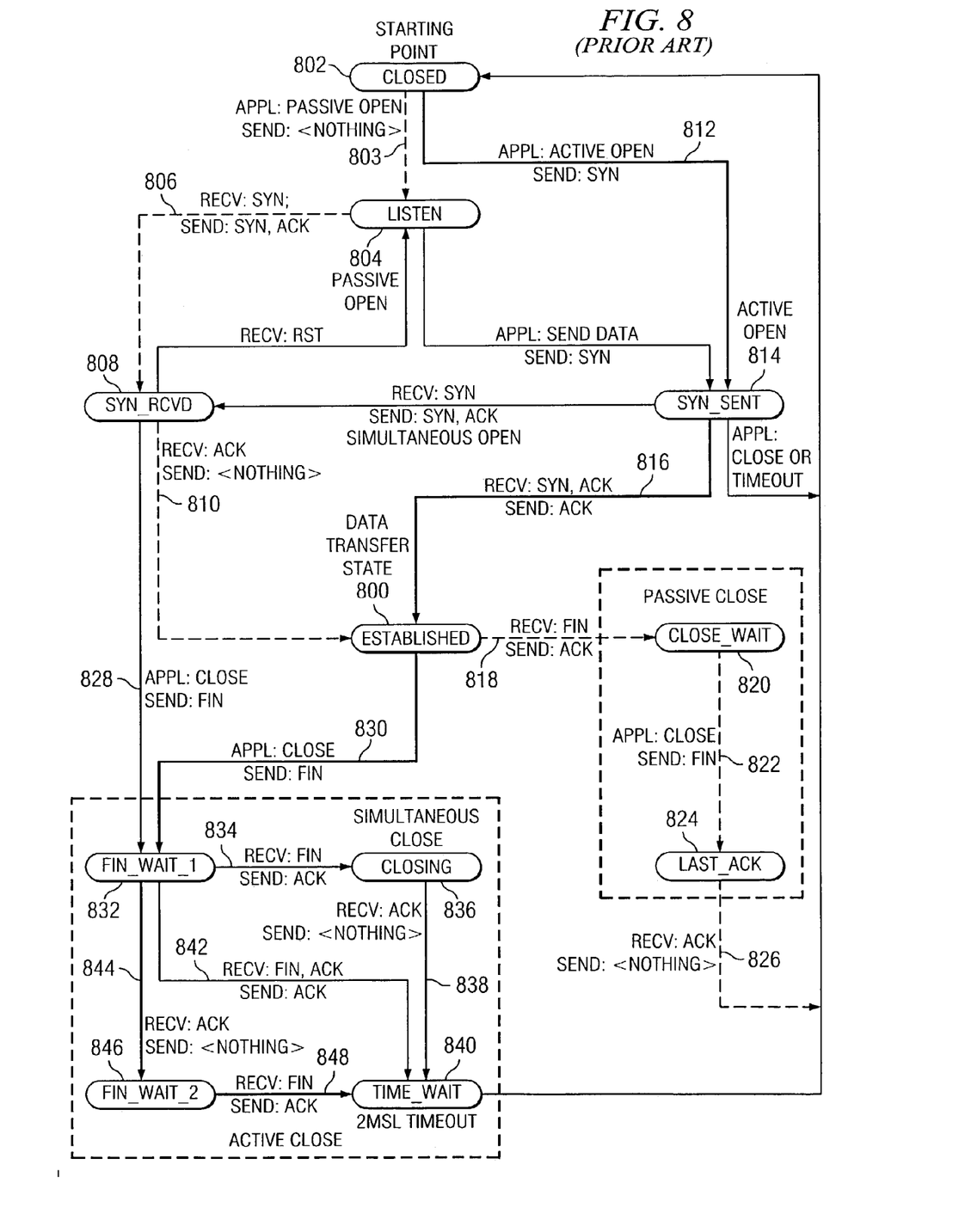
FIG. 8 is a TCP state diagram.

We now discuss how the failure of the adapter will be correctly handled in states other than ESTABLISHED. The full TCP state diagram depicting ESTABLISHED state 800 and the other TCP states is provided in FIG. 8. FIG. 8 is adapted from W. Richard Stevens, TCP/IP Illustrated, Vol. 1, Addison-Wesley, 1994, p. 241, FIG. 18.12. The names for the TCP states are those described in RFC (Request for Comments) 793, in which the TCP protocol is described. When a TCP connection is in a non-ESTABLISHED state, it is in one of 4 phases in the lifetime of a connection. These phases are: Active Open, Passive Open, Active Close and Passive Close. We show correctness for all of these phases below.

At this point, however, some additional explanatory remarks regarding the diagram in FIG. 8 are in order. The symbols "SYN," "FIN," and "ACK" appear repeatedly in the diagram. These are referring to flags within the TCP packet header (flags 406 in FIG. 4). A "SYN" and a "FIN," like an "ACK," are packets in which the "SYN" or "FIN" flags have been set, respectively. Also within the diagram are notations such as "SYN, ACK," where two flag names are juxtaposed together (this is also sometimes provided in the form "SYN-ACK" with a hyphen). This denotes a packet in which both the SYN and ACK flags are set. For the purposes of conditions 2A and 2B, we consider packets with either the SYN flag set or the FIN flag set as data packets. This ensures correctness.

We now traverse the FIG. 8 state diagram in the following discussion. The host with the offload engine/adapter will be referred to as the "offload host" and the remote end as the "remote host". It should be noted, for conceptual clarity, that because the host and adapter both keep track of state information, the host has a state that it believes the connection is in and the adapter also has a state that it believes the connection is in. The goal of the present invention is to ensure that even if the host and adapter are not perfectly synchronized, the host is in a state from which recovery is possible.

It should also be noted that at each transition, in general, an incoming packet is received, an outgoing packet is transmitted in response, and the state of the connection is changed. Thus, in the discussion below, a single transition may be referred to multiple times in order to discuss the reception of a packet, transmission of a packet, and the transition from one state to another state by the host and adapter.

1. Passive Open: This is the case in which the host listens for a connection request from the remote host. The offload host transitions from CLOSED (inactive) state 802 to LISTEN state 804 per the request of an application program (transition 803). When the remote host requests a connection, the offload host receives a SYN. Since a SYN is considered data, by condition 2B, the offload adapter cannot send a SYN-ACK (transition 806) until the host has been given the SYN. This means the host transitions from LISTEN state 804 to SYN_RCVD state 808 before the adapter does. When the final ACK of the handshake arrives, it may not be given to the host immediately since the adapter may be batching ACK notifications. This would change the state of the connection to ESTABLISHED (transition 810) on the adapter, but not on the host. However, note that by condition 2A, the host will not have "freed" its copy of the SYN for retransmission of the SYN-ACK (transition 806) until the host has seen an ACK for the SYN (transition 810). Hence, if the adapter fails at this point, when the host recovers it will retransmit the SYN-ACK (transition 806) and get a retransmitted ACK back, moving the state to ESTABLISHED state 800 (transition 810). Finally, when the host receives the notification of a connection arrival, the host will know that the state of the connection is ESTABLISHED 800 (transition 810).

2. Active Open: This is the situation in which the offload host is initiating a connection with the remote host (e.g., a server). In this case, the host submits a connect request to the adapter, which in turn transmits a SYN, transitioning the host and adapter to SYN_SENT state 814 (transition 812). When a SYN-ACK is received from the remote host, the adapter cannot return an ACK and change to ESTABLISHED state 800 (transition 816) until the host has been notified of the SYN-ACK. This follows from condition 2B since the SYN in the SYN-ACK is data. This means that the adapter changes the state to ESTABLISHED state 800 (transition 816) after the host has been given the SYN-ACK, and thus the host changes to ESTABLISHED state 800 (transition 816) as well. If the adapter fails before the SYN-ACK is passed to the host (i.e., prior to transition 816), the host state is in SYN_SENT state 814, which, by condition 2B, means the SYN-ACK has not been acknowledged to the remote end. Eventually the remote end will retransmit the SYN-ACK.

3. Passive Close: This is the situation in which the remote end initiates the termination of the connection. In this case, the adapter receives a FIN (transition 818). Since the FIN is considered data, by condition 2B, the adapter cannot send an ACK (transition 818) until the host has been notified. After the FIN has been given to the host, both the host and the adapter will change their connection states to CLOSE_WAIT state 820 (transition 818). If the adapter fails before the host is notified of the FIN, the FIN has not been ACKed, and the remote end will retransmit it. The application will eventually call close( ) (transition 822) which is visible to the host and the host will change the state to LAST_ACK state 824. After this the host either eventually receives the remote end's ACK (transition 826), or times out if the adapter fails.

4. Active Close: This is the situation in which the offload host initiates the termination of the connection. In this scenario, the application running on the offload host calls close( ), which is visible to the host, so the host changes its copy of the state to FIN_WAIT_1 state 832 (transition 830). From FIN_WAIT_1 state 832, the host may transition to one of three states depending upon the message received from the remote end. Examining each state case-by-case:

a) FIN_WAIT_1 to CLOSING: This happens when a FIN is received from the remote host before the sent FIN is ACKed (transition 834). Since a FIN is considered data, by condition 2B the adapter cannot send an ACK until the host has been given the FIN. Hence the card changes state to CLOSING state 836 only after the host has been given the FIN, which means that the host will also change state to CLOSING state 836. If the card fails before the remote FIN is passed to the host, an ACK would not have been sent for the remote FIN, and hence the remote end would have to retransmit it.

b) FIN_WAIT_1 to TIME_WAIT: This happens when a FIN-ACK is received (transition 842). Since a FIN is considered data, by condition 2B the adapter cannot ACK until the FIN-ACK has been given to the host. Hence the adapter changes the state to TIME_WAIT state 840 only after the FIN-ACK has been given to the host, which also changes state to TIME_WAIT state 840. If the adapter fails before the notification, an ACK will not have been generated for the FIN-ACK, and thus the remote end will have to retransmit the FIN-ACK.

c) FIN_WAIT_1 to FIN_WAIT_2: This happens when the adapter receives an ACK for the sent FIN (transition 844). The adapter may not immediately notify the host of this ACK since the card may be batching notifications. Hence the state on the card may be FIN_WAIT_2 state 846 while the host still has FIN_WAIT_1 832. If the card fails before the host has seen the ACK, by condition 2A, the host has not "freed" the FIN until the host has seen the corresponding ACK for it. In this case, when the host recovers, it will retransmit the FIN and get an ACK for it, and change the state to FIN_WAIT_2 state 846.

Continuing from each of these three states on the host:

a) CLOSING to TIME_WAIT: In CLOSING state 836, when the adapter sees an ACK, it changes state to TIME_WAIT state 840 (transition 838). The host may not see this ACK immediately since the card may be batching notifications. However, by condition 2A, until the host sees the ACK, it will not "free" its FIN and hence the FIN will be retransmitted. If the adapter fails, when the host recovers, the host will get eventually an ACK and change to TIME_WAIT (transition 838).

b) FIN_WAIT_2 to TIME_WAIT: In FIN_WAIT_2 state 846, when the adapter receives a FIN, it cannot ACK and change to TIME_WAIT state 840 (transition 848) until the FIN is passed to the host. This is due to condition 2B, since the FIN is considered data. This means that either the host will receive the notification and change state to TIME_WAIT state 840 before the card does, or if the adapter fails before this notification, the remote end will have to retransmit the FIN since it was not ACKed.

c) TIME_WAIT to CLOSED: In TIME_WAIT state 840 the host simply waits for the maximum segment lifetime (MSL), which RFC 793 specifies as a two minute period of time, before it releases the connection state.

This shows correctness for TCP states other than ESTABLISHED.

Thus, by enforcing conditions 2A and 2B, the host is able to recover hard state and thus perform a failover of a failed adapter. FIGS. 9A–9D are a series of diagrams depicting a failover process executed in accordance with a preferred embodiment of the present invention. First, for a failover to occur, adapter failure must be detected. Referring to stage 1 ("Detect card failure") in FIG. 9A, host 900, which maintains a number of connections (denoted by per-connection state information blocks 902) utilizing an adapter 904. Host 900 first detects that adapter 904 has failed. This can be done in a number of ways that are known in the art. One particular method that may be employed is for host 900 and adapter 904 to send period "heartbeat" messages to each other. If host 900 times out waiting for a heartbeat message to arrive from adapter 904, host 900 can safely assume that adapter 904 has failed and that a standby adapter 906 should replace failed adapter 904.

Figures 9A, 9B, 9C, 9D:
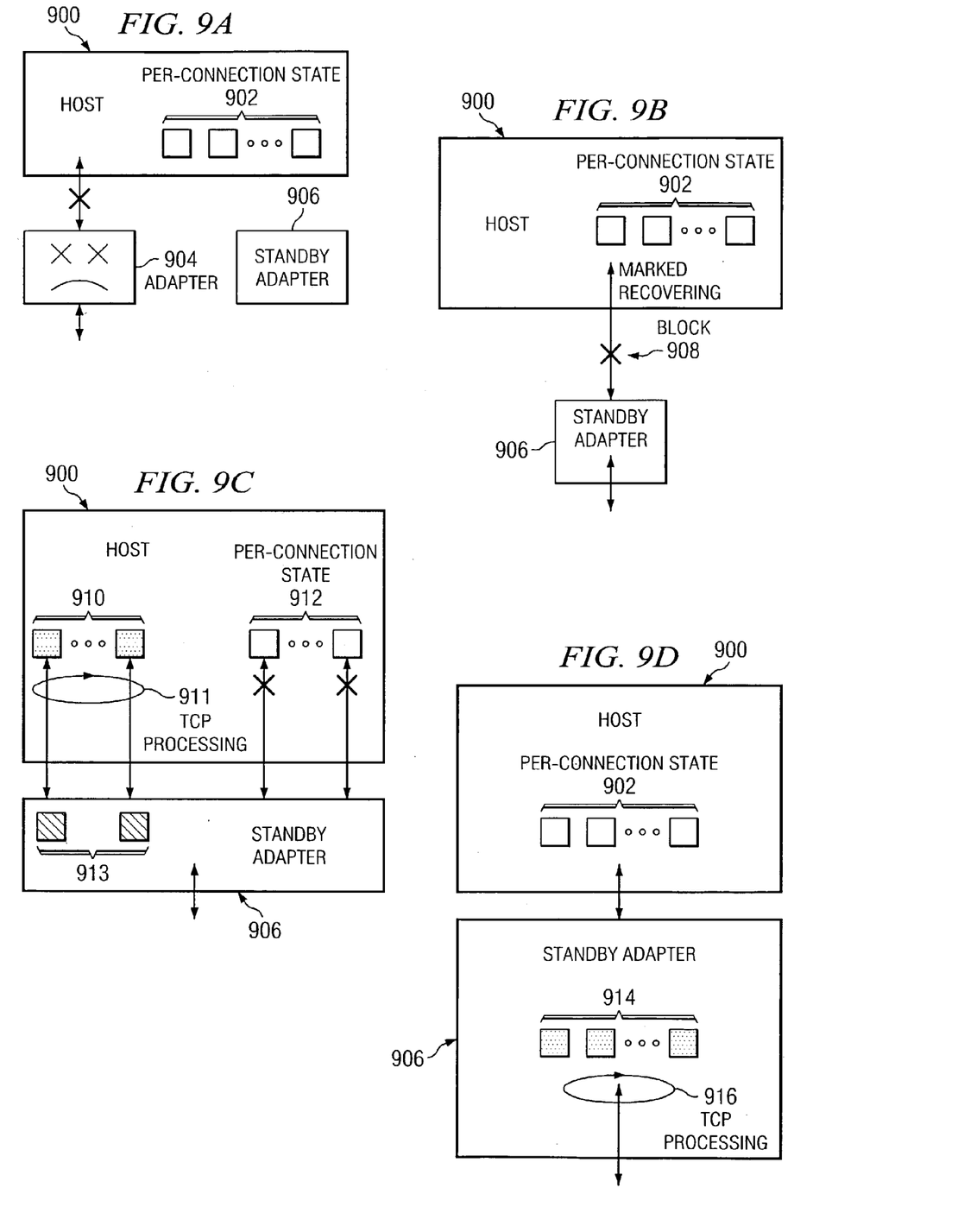
FIGS. 9A–9D are a series of diagrams depicting a failover process executed in accordance with a preferred embodiment of the present invention.

Referring now to stage 2 ("Blocking phase") in FIG. 9B, to begin the failover/recovery process, host 900 engages standby adapter 906, but blocks all packets from the network (blocking operation 908). Host 900 marks the state of each connection handled by failed adapter 904 (per-connection information 902) to indicate that these connections are in the "RECOVERING" state.

Referring now to stage 3 ("State reconstruction phase") in FIG. 9C, host 900 now unblocks the packets from the network and begins the process of recovering connections. In this stage, packets arriving to any connection in the RECOVERING state are dropped. All other connections are processed according to normal TCP processing. The following sequence of operations describes the per-connection recovery process:

1. A TCP protocol control block (a data structure to hold TCP connection state information) is created for each connection (e.g., protocol control block 913) and is populated with hard state connection parameters already known to host 900 (IP addresses, initial sequence numbers and negotiated options) from one of per-connection information blocks 912.
2. The congestion window and round-trip time estimation parameters (i.e., the soft state values) in protocol control block 913 are set to default values that are used when a TCP connection starts.
3. The received sequence number in protocol control block 913 is set to the initial value plus the number of bytes up to the last received data packet seen by host 900.
4. The received acknowledgment number in protocol control block 913 is set to the last value of received acknowledgment number reported by failed adapter 904. If no such update was received before the adapter failed, it is set to the initial value from connection establishment.
5. The sent sequence number in protocol control block 913 is set to the received acknowledgment number.
6. The sent acknowledgment number in protocol control block 913 is set to the received sequence number.
7. The send and receive buffers at adapter 906 for the connection are set to the buffers being maintained by host 900 for this connection.
8. The state of the connection is changed from RECOVERING to the state known just before adapter 904 failed. The host unblocks the packets coming to this connection and starts to perform TCP processing 911 for the connection.

Once a connection has been recovered, normal operation for that connection can resume at standby adapter 906, as shown in stage 4 ("Resume normal operation") in FIG. 9D. Alternatively, host 900 could take over TCP/IP processing, rather than using an intelligent standby adapter (network offload engine).

Figure 10:
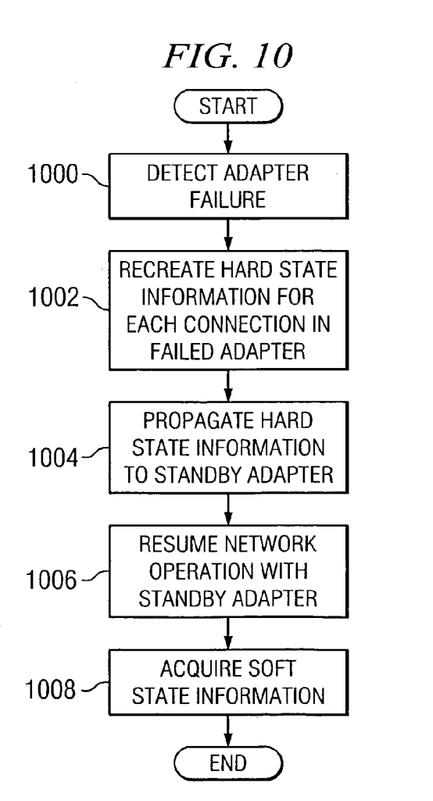
FIG. 10 is a flowchart representation of a process of performing a failover of a network offload engine in accordance with a preferred embodiment of the present invention.

FIG. 10 is a flowchart representation of a process of performing a failover of a network offload engine in accordance with a preferred embodiment of the present invention. First, the host detects an adapter failure (block 1000). The host then recreates whatever hard state information is not already stored in the host (block 1002). This hard state information is propagated to a standby network offload engine (or retained in the host, if a "dumb" standby adapter is used) (block 1004). Network operation is resumed using the standby adapter (block 1006). Finally, once network operation has resumed, any soft state information can be reacquired through observation of the network connection in practice (block 1008).

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. For example, rather than using the host to maintain information needed to recreate state, another location external to the network offload engine may be used, such as another adapter. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-based method for failover of a network offload engine in communication with a network and associated with a host, the method comprising:

reconstructing state information for the network offload engine from information stored at a location external to the network offload engine;

resuming network operation with a standby network adapter in accordance with the state information;

designating at least one selected network connection in the network offload engine as having failover support, wherein the state information is specific to the at least one selected network connection and network operation is resumed only with respect to the at least one selected network connection.

2. The method of claim 1, wherein the at least one selected network connection is designated as having failover support by setting a socket option associated with the at least one selected network connection.

3. The method of claim 1, wherein the location external to the network offload engine is the host.

4. The method of claim 1, wherein the location external to the network offload engine is one of the standby network adapter and another network adapter.

5. The method of claim 1, wherein information stored on the host is sufficient to reconstruct hard state information for the network offload engine.

6. The method of claim 5, further comprising:
acquiring soft state information during the resumed network operation with the standby network adapter.

7. The method of claim 5, wherein the hard state information includes at least one of a last sequence number received, a last sequence number sent, a last acknowledgement number received, and a last acknowledgement number sent.

8. The method of claim 5, wherein the network offload engine, when operable, sends an acknowledgment for received data only after the received data has been delivered to the host.

9. The method of claim 5, wherein a transmit buffer in the host is released only after an acknowledgment for transmitted data associated with the transmit buffer has been received by the network offload engine, when the network offload engine is operable.

10. The method of claim 5,
wherein the network offload engine, when operable, sends an acknowledgment for received data only after the received data has been delivered to the host; and
wherein a transmit buffer in the host is released only after an acknowledgment for transmitted data associated with the transmit buffer has been received by the network offload engine, when the network offload engine is operable.

11. The method of claim 1, further comprising:
checkpointing, on a pre-defined periodic basis, at least a subset of state information associated with the network offload engine, when operable, by copying the at least a subset of state information associated with the network offload engine to memory in the host.

12. The method of claim 1, further comprising:
detecting failure of the network offload engine; in response to detecting the failure of the network offload engine, identifying connections associated with the network offload engine;
designating the connections as recovering connections;
recovering state information for each of the recovering connections; and
resuming network operation of each of the recovering connections on the standby network adapter as the state information for each of the recovering connections is recovered.

13. The method of claim 1, wherein the standby network adapter is a standby network offload engine.

14. The method of claim 1, wherein the standby network adapter requires the host to perform protocol processing.

15. A computer program product in a computer-readable medium for failover of a network offload engine in communication with a network and associated with a host, the computer program product comprising functional descriptive material that, when executed by a computer, enables the computer to perform acts including:

reconstructing state information for the network offload engine from information stored at a location external to the network offload engine;
resuming network operation with a standby network adapter in accordance with the state information;
designating at least one selected network connection in the network offload engine as having failover support.
wherein the state information is specific to the at least one selected network connection and network operation is resumed only with respect to the at least one selected network connection.

16. The computer program product of claim 15, wherein the at least one selected network connection is designated as having failover support by setting a socket option associated with the at least one selected network connection.

17. The computer program product of claim 15, wherein the location external to the network offload engine is the host.

18. The computer program product of claim 15, wherein the location external to the network offload engine is one of the standby network adapter and another network adapter.

19. The computer program product of claim 15, wherein information stored on the host is sufficient to reconstruct hard state information for the network offload engine.

20. The computer program product of claim 19, comprising additional functional descriptive material that, when executed by the computer, enables the computer to perform additional acts including:
acquiring soft state information during the resumed network operation with the standby network adapter.

21. The computer program product of claim 19, wherein the hard state information includes at least one of a last sequence number received, a last sequence number sent, a last acknowledgement number received, and a last acknowledgement number sent.

22. The computer program product of claim 19, wherein the network offload engine, when operable, sends an acknowledgment for received data only after the received data has been delivered to the host.

23. The computer program product of claim 19, wherein a transmit buffer in the host is released only after an acknowledgment for transmitted data associated with the transmit buffer has been received by the network offload engine, when the network offload engine is operable.

24. The computer program product of claim 19,
wherein the network offload engine, when operable, sends an acknowledgment for received data only after the received data has been delivered to the host; and
wherein a transmit buffer in the host is released only after an acknowledgment for transmitted data associated with the transmit buffer has been received by the network offload engine, when the network offload engine is operable.

25. The computer program product of claim 15, comprising additional functional descriptive material that, when executed by the computer, enables the computer to perform additional acts including:
checkpointing, on a pre-defined periodic basis, at least a subset of state information associated with the network offload engine, when operable, by copying the at least a subset of state information associated with the network offload engine to memory in the host.

26. The computer program product of claim 15, comprising additional functional descriptive material that, when executed by the computer, enables the computer to perform additional acts including:

detecting failure of the network offload engine; in response to detecting the failure of the network offload engine, identifying connections associated with the network offload engine;

designating the connections as recovering connections;

recovering state information for each of the recovering connections; and resuming network operation of each of the recovering connections on the standby network adapter as the state information for each of the recovering connections is recovered.

27. The computer program product of claim 15, wherein the standby network adapter is a standby network offload engine.

28. The computer program product of claim 15, wherein the standby network adapter requires the host to perform protocol processing.

29. A data processing system for failover of a network offload engine in communication with a network and associated with a host, the method comprising:

means for reconstructing state information for the network offload engine from information stored at a location external to the network offload engine;

means for resuming network operation with a standby network adapter in accordance with the state information;

means for designating at least one selected network connection in the network offload engine as having failover support.

wherein the state information is specific to the at least one selected network connection and network operation is resumed only with respect to the at least one selected network connection.

30. The data processing system of claim 29, wherein the at least one selected network connection is designated as having failover support by setting a socket option associated with the at least one selected network connection.

31. The data processing system of claim 29, wherein the location external to the network offload engine is the host.

32. The data processing system of claim 29, wherein the location external to the network offload engine is one of the standby network adapter and another network adapter.

33. The data processing system of claim 29, wherein information stored on the host is sufficient to reconstruct hard state information for the network offload engine.

34. The data processing system of claim 33, further comprising:

means for acquiring soft state information during the resumed network operation with the standby network adapter.

35. The data processing system of claim 33, wherein the hard state information includes at least one of a last sequence number received, a last sequence number sent, a last acknowledgement number received, and a last acknowledgement number sent.

36. The data processing system of claim 33, wherein the network offload engine, when operable, sends an acknowledgment for received data only after the received data has been delivered to the host.

37. The data processing system of claim 33, wherein a transmit buffer in the host is released only after an acknowledgment for transmitted data associated with the transmit buffer has been received by the network offload engine, when the network offload engine is operable.

38. The data processing system of claim 33, wherein the network offload engine, when operable, sends an acknowledgment for received data only after the received data has been delivered to the host; and wherein a transmit buffer in the host is released only after an acknowledgment for transmitted data associated with the transmit buffer has been received by the network offload engine, when the network offload engine is operable.

39. The data processing system of claim 29, further comprising:

means for checkpointing, on a pre-defined periodic basis, at least a subset of state information associated with the network offload engine, when operable, by copying the at least a subset of state information associated with the network offload engine to memory in the host.

40. The data processing system of claim 29, further comprising:

means for detecting failure of the network offload engine;

means, responsive to detecting the failure of the network offload engine, for identifying connections associated with the network offload engine;

designating the connections as recovering connections;

recovering state information for each of the recovering connections; and resuming network operation of each of the recovering connections on the standby network adapter as the state information for each of the recovering connections is recovered.

41. The data processing system of claim 29, wherein the standby network adapter is a standby network offload engine.

42. The data processing system of claim 29, wherein the standby network adapter requires the host to perform protocol processing.

43. A data processing system comprising:

a host;

a network offload engine in communication with a network and associated with the host, the data processing system comprising;

a standby network adapter in communication with the network and associated with the host; and a host control program associated with the host, wherein the host executes the host control program to perform acts including:

reconstructing state information for the network offload engine from information stored in the host;

resuming network operation with the standby network adapter in accordance with the state information;

designating at least one selected network connection in the network offload engine as having failover support, wherein the state information is specific to the at least one selected network connection and network operation is resumed only with respect to the at least one selected network connection.

* * * * *